Feb. 23, 1960 G. F. ABBOTT, JR 2,926,334
ERROR DETECTION CIRCUIT
Filed April 20, 1955
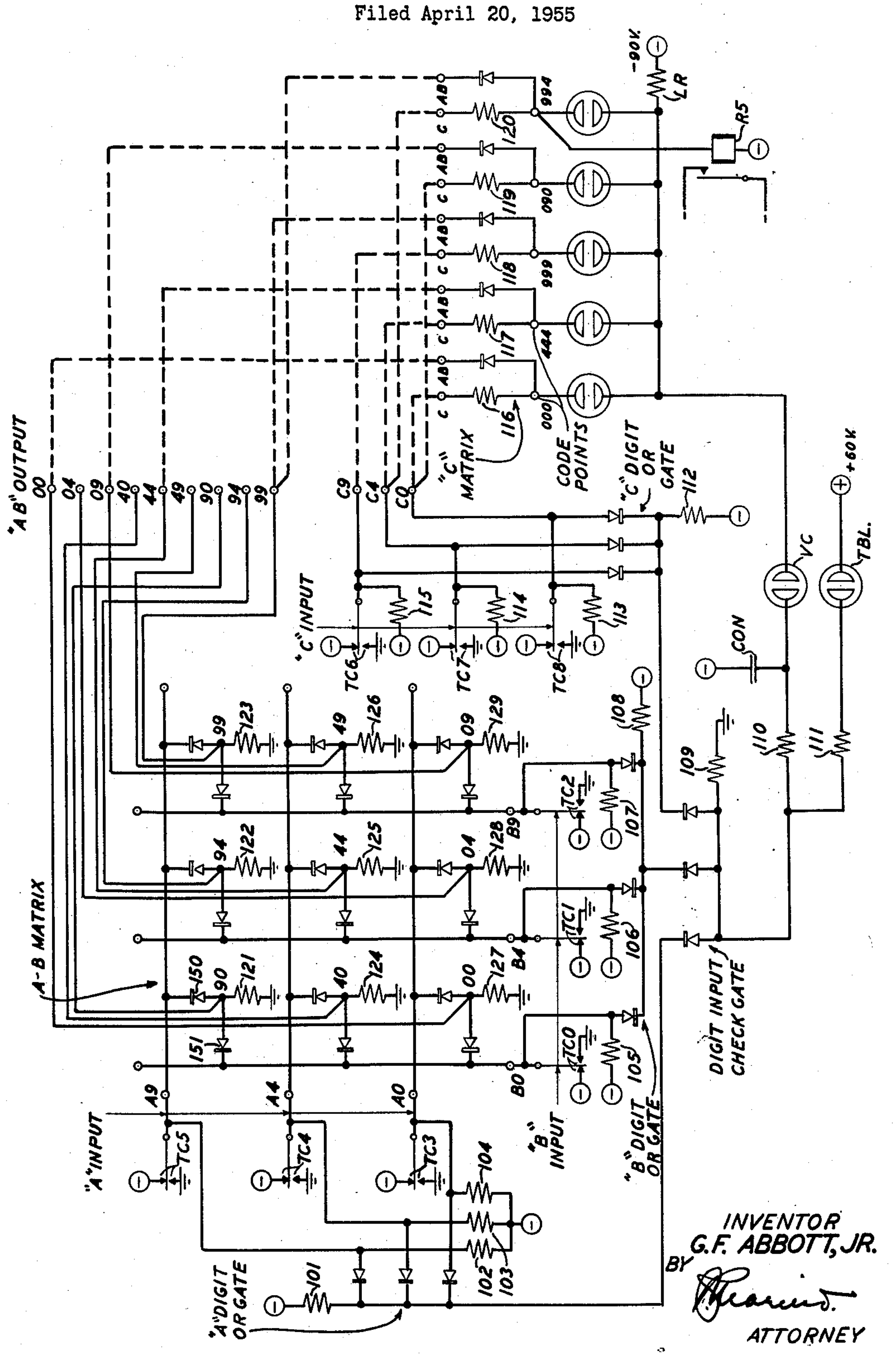
INVENTOR
G.F. ABBOTT, JR.
BY [signature]
ATTORNEY United States Patent Office 2,926,334

Patented Feb. 23, 1960

2,926,334

ERROR DETECTION CIRCUIT

George F. Abbott, Jr., New York, N.Y., assignor to Bell Telephone Laboratories, Incorporated, New York, N.Y., a corporation of New York Application April 20, 1955, Serial No. 502,559

11 Claims. (Cl. 340—147)

This invention relates to error detection circuits and more particularly to means for detecting irregularities of operation in translating devices.

An important feature of an automatic switching system is the ability to function with limited manual attention. Aberrations or abnormalities in operating conditions must be recognized, and devices prepared to render warnings as a result thereof. In certain forms of switching equipment, such as complex digital computing devices, for example, a single error will give a wrong answer for an entire series of computations unless adequate checking features are provided to block operations beyond the error point.

Some prior art checking devices have occasioned for their proper functioning sufficient additional circuit complexity to possibly increase or multiply the likelihood of a circuit failure. Certain other prior art checking circuits depend for their operation on marginal or amplitude sensitive devices which relate to the intensity of the various input signals. Although operative, these circuits are critical in their operation inasmuch as accurate signal strengths are essential to the criteria examined.

It is an object of this invention to provide apparatus required for checking purposes with a minimum of additional circuit complexity.

Another object of this invention is to provide checking means for a translating device which will energize a trouble indicating device when an insufficient amount of input data is delivered to the translating device.

A further object of this invention is to provide a device for indicating visually a code combination which is incapable of translation by the translating device.

Still another object of this invention is to provide a translating device having checking means independent of the marginal or amplitude sensitive aspects of prior art circuits.

These and other objects are accomplished by an embodiment in which a two-stage translator circuit capable of translating from a three-digit input to a one-in-a-thousand-code is shown. The inputs to the translator are on a one-out-of-ten basis and are referred to as A, B and C inputs. The A and B input leads form a crystal diode matrix, at the crosspoints of which an "AND" gate is provided. One hundred of these "AND" gates are formed by the intersection of the A and B input leads. An output from an individual gate is obtained when one A input lead and one B input lead connected to the same gate are grounded coincidentally. For a discussion of "AND" gates and related circuits, reference is made to the "Design of Switching Networks" by W. Keister et al., published in 1951 by D. Van Nostrand Company, Incorporated.

The C matrix has as its inputs, the output from the A–B matrix and the C digital inputs. An output is obtained from the C matrix when both a particular A–B input and a C input are grounded coincidentally. Lamps, for example of the neon type, are connected to the outputs of the C matrix and serve to indicate the code point which is selected.

A feature of this translator is the checking circuit which is used for detecting irregularities of operation and also for detecting vacant codes. This circuit comprises as part of the checking feature a succession of control gates including "AND" and "OR" gates. The input lead for each of the A, B and C digits is connected to an "OR" gate. Consequently, if any one of the ten digits in the A, B or C inputs is energized, the corresponding A, B and C, "OR" gates will be energized. The output of each of these "OR" gates is connected to an "AND" gate referred to herein as a digit-input check gate. If all of the inputs of the digit-input check gate are at ground, the output of the gate will be at ground and there will be no trouble indication. If an incomplete registration is received, that is, if there is no A or B or C input, or if no registration of any digit whatsoever is received, the "OR" gate corresponding to the omitted digits will not be activated. In such an event the digit-input check gate will not be activated. This condition introduces a negative potential at the output of said digit-input check gate, causing a trouble lamp to light.

Additional means are provided for indicating a vacant code point by means of a vacant code lamp. When a code is selected for which an output has not been structurally provided in the translator, the vacant code lamp will light. This feature is advantageous in conjunction with the translator since only those output points that are required are provided, thus reducing the size of the translator to the number of code points actually required.

The invention will be more fully understood from the following description and accompanying drawing in which the single figure shows a circuit illustrative of one embodiment of applicant's invention, including two stages of crystal matrices, digital input checking means and the vacant code indicator.

Referring to the figure, an A–B matrix is shown which selects one lead from a maximum of 100. The inputs to the A–B matrix are the A and B digits which are on a digital or one-out-of-ten basis. The A and B input leads form a crystal diode matrix, at the crosspoints of which an "AND" gate is provided. Each "AND" gate, for example gate 90, comprises two varistors 150, 151 and a resistor 121. In the A–B matrix only three out of the ten digital A inputs are shown. These are inputs A0, A4 and A9. Similarly, only three of the ten B digit inputs, B0, B4 and B9 are shown. Nine "AND" gates 00, 04, 09, 40, 44, 49, 90, 94 and 99 are formed at the intersections of the above mentioned A and B digital input leads.

The C matrix comprises a number of code terminals which may be as many as 1,000, whereas only five terminals 000, 444, 999, 090 and 994 are shown. The code terminals are intended to be provided as required, one per code. To each code terminal is connected a varistor and a resistor, the varistor being also connected to the appropriate A–B output junction and the resistor to the appropriate C digit input terminal. A neon lamp is connected to the output side of each code terminal to indicate, by glowing, the code terminal selected. A relay R5 is shown connected to output code terminal 994 to illustrate the operation of a relay by the translator when a particular code terminal is activated.

Each of the groups A, B and C digital inputs is connected to a separate "OR" or buffer gate, shown in the figure as the A digit "OR" gate, B digit "OR" gate and C digit "OR" gate. The outputs of these three gates are connected to an "AND" or coincidence gate, referred to in the figure as a digit-input check gate.

A trouble indicator neon lamp TBL is connected to the digit-input check gate to signal an incomplete registration when received, while a vacant code neon lamp VC is adapted to be energized when a code terminal represented by the A, B and C input digits is not provided for in the physical embodiment.

Having thus described in general the structure embodying my invention, I will now describe it in detail in connection with its operation.

Assume for exemplary purposes that the A digital input is 9, the B digital input is 9 and the C digital input is 4. Since the input condition is represented by a ground or zero voltage and the no-input condition by a negative voltage, for example minus 48 volts, leads A9, B9 and C4 will have ground applied to them while the remaining leads will be maintained at minus 48 volts. The manner of applying these potentials to the input leads may vary and is shown illustratively by transfer contact TC0, TC1, TC2, TC3, etc. through TC8. The proper operating voltages are introduced by switching means (not shown) at the desired circuit locations in synchronism with the A, B and C digital inputs, and are removed between translation periods. Examining the A–B matrix, it may be seen that all of the varistor gates connected to input lead A9 will have ground applied to them. Similarly, all varistor gates connected to lead B9 will have ground applied to them. The characteristics of these varistor gates are such, however, that if both of the inputs to the gate are grounded, the A–B output lead from the gate will be at ground potential. If a gate has either or both inputs at minus 48 volts, the output lead will be approximately the same voltage. Consequently, only that varistor gate which is at the intersection of two energized A and B input leads will have its output at ground or zero potential. In the assumed case, varistor gate 99, which is at the intersection of leads A9 and B9, will have its output lead, traceable from the common terminal of the two varistors to A–B output junction 99, at ground potential.

Considering the C matrix, it may be seen that all of those resistor gates which are connected to input lead C4 will have their C inputs at ground or zero potential. These resistor gates function, however, in such a manner that if the A–B input and C input are at minus 48 volts, the code terminal output will also be at minus 48 volts. If the C input is at ground potential and the A–B input is at minus 48 volts, approximately minus 35 volts will appear at the code terminal output. When the A–B input is at ground potential and the C input is at minus 48 volts, the output will be very nearly minus 48 volts. If both the A–B input and the C input are at ground potential the output will be at ground potential and current may be drawn if required from the output, limited largely by the capacity of the varistors. In the illustration assumed, varistor gate 994 which has its A–B input at ground potential and its C input at ground potential, will have its code terminal output 994 at ground potential. The neon lamp connected in series with the code terminal output to a minus 90-volt source, by way of example, will ionize, indicating that code point 994 is the selected one. None of the other neon lamps in series with code points will be energized. Relay R5 which is also connected between code point 994 and a minus 48-volt source will likewise be energized to operate its contacts and perform whatever operations are intended thereby.

To illustrate the checking features of the circuit it may be assumed that leads A9 and B9 are energized but that no C digital input lead is energized. This is an obvious abnormality in input data to the translator and the trouble lamp TBL should light. The A digit "OR" gate, which has a varistor connected to each of the A digit input leads, will have its output at ground potential if any one of the A digit input leads becomes grounded. Similarly, the B digit "OR" gate which has a varistor connected to each of the B digital input leads will have its output at ground potential if any of the B digital input leads are grounded. Since, in the assumed situation, leads A9 and B9 are energized, both the A digit "OR" gate and the B digit "OR" gate will have their outputs at ground or zero potential. However, inasmuch as no C digital input lead has been activated, the C digit "OR" gate will not be at ground potential but at minus 48 volts. The outputs of the A, B and C "OR" gates are connected to the digit-input check gate, which serves as an "AND" gate. In the assumed situation the output of the digit-input check gate will be substantially minus 24 volts and the trouble lamp TBL will light from the positive potential source, shown by way of example as 60 volts, indicating that the translator has received an incomplete registration. Similar circuit operations will occur upon the lapse or omission of either the A or B digital input leads severally or jointly, and also for the total failure of any input data to the translator.

If the three digital inputs are present, however, the digit-input check gate output is at ground potential, and the vacant code lamp VC attempts to light. If a code terminal has been activated, its associated neon lamp will be energized, and inasmuch as the load resistance LR is common for the code terminal neon lamps and for the vacant code lamp VC, the vacant code lamp will not light due to the voltage drop across the load resistance. A time lag introduced by the capacitor CON associated with the vacant code lamp will favor the code terminal lamps, and enable them to light in preference to the vacant code lamp if a code terminal has been energized. If no code terminal has been energized, then the vacant code lamp VC will light from the minus 90-volt source over an obvious circuit.

The following values are offered as illustrative of those which the circuit parameters may advantageously take.

All polarities other than those expressly shown—minus 48 volts.

All varistors—Western Electric Type 400A.

| Resistors: | Ohms |
|---|---|
| 101 | 200,000 |
| 102–104 | 1,000 |
| 105–107 | 1,000 |
| 108 | 200,000 |
| 109 | 200,000 |
| 110 | 200,000 |
| 111 | 300,000 |
| 112 | 200,000 |
| 113–115 | 1,000 |
| 116–120 | 1,000 |
| 121–129 | 100,000 |
| LR | 100,000 |

All neon lamps—General Electric Type NE-2.
Relay R5—Western Electric Type UA-13.
Condenser (CON)—0.1 microfarad.

While I have illustrated my invention by particular embodiments thereof, said invention is not limited in its application to the specific apparatus and particular arrangements herein disclosed. Various applications, modifications and arrangements of the invention will readily occur to those skilled in the art.

What is claimed is:

1. A translating device comprising in combination a plurality of serially connected diode matrices, a plurality of input conductors connected to said diode matrices, a plurality of coded output conductors each representing code combinations and each connected to one of said diode matrices, each of said diode matrices including a plurality of coincidence gating elements, said gating elements in one of said diode matrices comprising a varistor and a resistor, means for concurrently energizing a predetermined number of said input conductors representing a code combination, means responsive to the energization of said number of input conductors for energizing one of said output conductors denoting said code combination, an error detection circuit connected to said input conductors, means responsive to the energization of less than said predetermined number of input conductors for operating said error detection circuit, vacant code indicating means connected to said output conductors, and means responsive to the operation of said error detection circuit and to the energization of a particular group of input conductors representing a code combination other than the code combination denoted by any one of said output conductors for operating said vacant code indicating means.

2. A translating device comprising a first diode matrix and a second diode matrix, each of said matrices comprising a plurality of coincidence gating elements, a portion of said elements including two varistors, the remaining elements including a varistor and a resistor, a plurality of input conductors connected to said matrices, means connecting the output of said first diode matrix to the input of said second diode matrix, a plurality of coded output conductors connected to said second diode matrix, means for concurrently energizing a predetermined number of input conductors in said matrices, means responsive to the energization of said predetermined number of input conductors for activating a particular gating element, means including one of said output conductors responsive to the operation of said gating element for indicating the code designation represented by said energized number of input conductors, error indicating means, means responsive to the energization of less than the predetermined number of input conductors for operating said error indicating means, vacant code indicating means, and means controlled by said means for operating said error indicating means and responsive to the energization of a particular group of input conductors representing a code combination other than the code combination denoted by any one of said output conductors for operating said vacant code indicating means.

3. A translating device comprising a plurality of diode matrices, a plurality of input conductors connected to said diode matrices, a plurality of coded output conductors connected to said diode matrices, error indicating means connected to said input conductors, means for concurrently applying an activating signal potential to a predetermined number of said input conductors representing a code combination, a plurality of coincidence gating elements connected to said input conductors and responsive to the activation of less than the predetermined number of input conductors for operating said error indicating means, a vacant code indicating device connected to said output conductors, and means controlled by said plurality of coincidence gating elements and responsive to the activation of a particular group of input conductors representing a code combination other than the code combination denoted by any one of said output conductors for operating said vacant code indicating means.

4. A translating device comprising a plurality of coincidence gating elements, certain of said elements comprising two varistors, certain other of said elements comprising a varistor and a resistor, a plurality of input conductors connected to said gating elements, a plurality of coded output conductors connected to said gating elements, means for concurrently energizing a predetermined number of said input conductors representing a code combination, means responsive to the energization of said number of input conductors for energizing a particular one of said output conductors denoting said code combination, neon lamp indicating means connected to said output conductors and responsive to the energization of said number of input conductors for visually indicating the code selected, neon lamp vacant code indicating means connected to said output conductors, and means responsive to the energization of a particular group of input conductors representing a code combination other than the code combination denoted by any one of said output conductors for operating said neon lamp vacant code indicating means.

5. A translating device comprising in combination a plurality of coincidence gating elements, certain of said elements comprising two varistors, certain other of said elements comprising a varistor and a resistor, a plurality of input conductors connected to said gating elements, a plurality of coded output conductors connected to said gating elements, means for concurrently energizing a predetermined number of said input conductors representing a code combination, means responsive to the energization of said predetermined number of said input conductors for energizing a particular one of said output conductors denoting said code combination, neon lamp indicating means connected to said output conductors for indicating the particular code combination selected, error indicating means, additional coincidence gating elements connected to said input conductors and responsive to the energization of less than said predetermined number of input conductors for operating said error indicating means, vacant code neon lamp indicating means connected to said output conductors, and means controlled by said additional coincidence gating elements and responsive to the energization of a group of input conductors representing a code combination other than the code combination denoted by any one of said output conductors for operating said vacant code indicating means.

6. A code translating device comprising a plurality of stages, each of said stages including a diode matrix having input and output conductors, the first stage of said device including a plurality of coincidence gating elements connecting said input and said output conductors, each of said elements comprising two diodes, means connecting the output conductors of said first stage to input conductors of the second stage, means for concurrently applying an activating signal potential to a predetermined number of input conductors according to a code combination, means responsive to the activation of said predetermined number of input conductors for activating a particular output conductor in said second stage denoting said code combination, and error detecting means comprising a plurality of diodes individually connected to said input conductors to form a plurality of buffer gates, each of said buffer gates being operative responsive to an activating signal potential applied to any of said input conductors connected thereto, additional diodes connected to said plurality of buffer gates to form a single coincidence gate, said single coincidence gate being operative responsive to the operation of said plurality of buffer gates, and error indicating means connected to said single gate being operative responsive to said single gate.

7. A translating device comprising a plurality of serially connected stages, each of said stages including a matrix, a plurality of input leads connected to each of said matrices, a plurality of output leads connected to said matrices, means for selectively energizing a predetermined number of all of said input leads according to a code combination, means including said matrices responsive to the energization of said number of input leads to activate a particular one of said output leads denoting said code combination, a plurality of diodes distinct from said matrices individually connected to said input conductors of each of said matrices to form a plurality of "OR" gates, additional diodes distinct from said matrices connected to said "OR" gates to form an "AND" gate, and error indicating means, said "OR" and "AND" gates being responsive to the energization of less than said predetermined number of input leads for operating said error indicating means.

8. A code translating device comprising a plurality of coincident gating means arranged in matrices, a plurality of coded input and output leads connected to said coincident gating means, means for selectively energizing a predetermined number of said input leads thereby causing said gating means to energize a particular one of said output leads, error indicating means, a first plurality of diode gating elements, the anodes of said gating elements being individually connected to said input leads to form a plurality of buffer gates, the cathodes of all of said gating elements in each of said buffer gates being connected together, and a second plurality of diode gating elements connected to the cathodes of said first plurality of gating elements to form a single control coincidence gate, said plurality of buffer gates and said single control coincidence gate being responsive to the energization of less than said predetermined number of input leads for operating said error indicating means.

9. A translator comprising, in combination, a plurality of serially connected diode matrices, a plurality of input conductors connected to said diode matrices, a plurality of coded output conductors connected to one of said diode matrices, each of said coded output conductors representing a unique combination of input conductors, each of said diode matrices including a plurality of coincidence gating elements, said gating elements in one of said diode matrices comprising a varistor and a resistor, means for concurrently energizing a predetermined number of said input conductors for energizing one of said output conductors, error indicating means, a first plurality of diodes, the anodes of said diodes being individually connected to said input conductors and through impedance means to negative battery to form a plurality of buffer gates, and a second plurality of diodes, the cathodes of said second plurality of diodes being connected to the cathodes of said first plurality of diodes, the anodes of said second plurality of diodes being joined and connected through impedance means to ground to form a single control coincidence gate, said plurality of buffer gates and said single control coincidence gate being responsive to the energization of less than the predetermined number of input conductors for operating said error indicating means.

10. In a translating device, in combination, a plurality of serially connected diode matrices, a plurality of input conductors connected to said diode matrices, a plurality of coded output conductors representing combinations of input conductors and connected to one of said diode matrices, each of said diode matrices including a plurality of coincidence gating elements, said gating elements in one of said diode matrices comprising a varistor and a resistor, means for concurrently energizing a predetermined number of said input conductors, means responsive to the energization of said number of input conductors for energizing one of said output conductors, error indicating means, a plurality of "OR" gates equal in number to the number of input conductors, each of said "OR" gates including a plurality of semiconductor diodes, the cathodes of said semiconductor diodes being joined and connected through impedance means to negative battery, the anodes of said semiconductor diodes being individually connected to said input conductors and through impedance means to negative battery, additional diodes connected to said "OR" gates to form an "AND" gate, said "AND" gate including a plurality of semiconductor diodes equal in number to the number of "OR"

gates, said "OR" and "AND" gates being responsive to the energization of less than said predetermined number of input leads for operating said error indicating means.

11. A translating device comprising a first diode matrix and a second diode matrix, each of said matrices comprising a plurality of coincidence gating elements, a portion of said elements including two varistors, the remaining elements including a varistor and a resistor, a plurality of input conductors connected to said matrices, means connecting the output of said first diode matrix to the input of said second diode matrix, a plurality of coded output conductors connected to said second diode matrix, means for concurrently energizing a predetermined number of input conductors in said matrices according to a code combination, means responsive to the energization of said predetermined number of input conductors for activating a particular gating element in said second matrix, means including one of said output conductors responsive to the activation of said gating element for indicating the code combination represented by said energized number of input conductors, a plurality of semiconductor diodes individually connected to said input conductors to form three "OR" gates, each of said "OR" gates including ten semiconductor diodes, the anodes of said "OR" gate diodes being individually connected to said input conductors and through impedance means to ground, the cathodes of said "OR" gate diodes being joined and connected through impedance means to negative battery, three additional semiconductor diodes connected to said "OR" gates to form an "AND" gate, each of said "AND" gate diodes having its cathode connected to the cathodes of one of said "OR" gates, the anodes of said "AND" gate diodes being joined and connected through impedance means to ground, error indicating means connected serially between the anodes of said "AND" gate diodes and positive battery through impedance means, said "OR" and "AND" gates being responsive to the energization of less than said predetermined number of input conductors for operating said error indicating means, vacant code indicating means serially connected through impedance means to the anodes of said "AND" gate diodes and to said means for indicating the code combination represented by said energized number of input conductors, and additional means connecting said vacant code indicating means through impedance means to negative battery, said vacant code indicating means being responsive to the energization of a particular group of input conductors other than the code combinations indicated by any one of said output conductors.

References Cited in the file of this patent

UNITED STATES PATENTS

| | | |
|---|---|---|
| 2,244,700 | Horton | June 10, 1941 |
| 2,276,293 | Farmer | Mar. 17, 1942 |
| 2,446,643 | Farmer | Aug. 10, 1948 |
| 2,473,444 | Rajchman | June 14, 1949 |
| 2,484,226 | Holden | Oct. 11, 1949 |
| 2,680,781 | Avery | June 8, 1954 |
| 2,724,739 | Harris | Nov. 22, 1955 |
| 2,734,187 | Rajchman | Feb. 7, 1956 |